United States Patent [19]

Torbjørnsen et al.

[11] Patent Number: 5,555,404

[45] Date of Patent: Sep. 10, 1996

[54] CONTINUOUSLY AVAILABLE DATABASE SERVER HAVING MULTIPLE GROUPS OF NODES WITH MINIMUM INTERSECTING SETS OF DATABASE FRAGMENT REPLICAS

[75] Inventors: Øystein Torbjørnsen; Svein-Olaf Hvasshovd, both of Trondheim, Norway

[73] Assignee: Telenor AS, Trondheim, Norway

[21] Appl. No.: 451,885

[22] Filed: May 26, 1995

Related U.S. Application Data

[63] Continuation-in-part of Ser. No. 336,331, Nov. 8, 1994, Pat. No. 5,423,037, which is a continuation of Ser. No. 852,669, Mar. 17, 1992, abandoned.

[51] Int. Cl.$^6$ .......................... G06F 17/30; G06F 11/20; G06F 9/28

[52] U.S. Cl. ............... 395/600; 395/182.08; 364/931.43; 364/931.45; 364/945.3; 364/944.3; 364/944.61; 364/963.3; 364/974.7; 364/975.5; 364/DIG. 2

[58] Field of Search ...................... 364/931.43, 931.45, 364/944.3, 944.6, 945.3, 963.3, 974.7, 975.5, 268, 268.3, 282, 282.1, 282.2, 282.3, 282.4, 285, 285.3; 395/600, 182.08, 182.11, 182.18, 182.04, 182.01, 182.02, 800, 200.03

[56] References Cited

U.S. PATENT DOCUMENTS

| | | | |
|---|---|---|---|
| 4,432,057 | 2/1984 | Daniell et al. | 395/600 |
| 4,716,528 | 12/1987 | Crus et al. | 395/650 |
| 4,933,838 | 1/1990 | Elrod | 395/182.01 |
| 5,005,174 | 4/1991 | Bruckert et al. | 395/182.09 |
| 5,006,978 | 4/1991 | Neches | 395/650 |
| 5,170,480 | 12/1992 | Mohan et al. | 395/600 |
| 5,170,482 | 12/1992 | Shu et al. | 395/800 |
| 5,276,871 | 1/1994 | Howarth | 395/600 |
| 5,282,201 | 1/1994 | Frank et al. | 370/94.1 |
| 5,333,314 | 7/1994 | Masai et al. | 395/600 |
| 5,423,037 | 6/1995 | Hvasshovd | 395/600 |

OTHER PUBLICATIONS

Ceri, S. Pelagatti, G., "Distributed Databases Principles & Systems", 1984, pp. 12–15, 181, 343–347, McGraw–Hill, Inc.

(List continued on next page.)

*Primary Examiner*—Thomas G. Black
*Assistant Examiner*—Jack M. Choules
*Attorney, Agent, or Firm*—Flehr, Hohbach, Test, Albritton & Herbert

[57] ABSTRACT

A database server with a "shared nothing" system architecture has multiple nodes, each having its own central processing unit, primary and secondary memory for storing database tables and other data structures, and communication channels for communication with other ones of the nodes. The nodes are divided into at least two groups that share no resources. Each database table in the system is divided into fragments distributed for storage purposes over all the nodes in the system. To ensure continued data availability after a node failure, a "primary replica" and a "standby replica" of each fragment are each stored on nodes in different ones of the groups. Database transactions are performed using the primary fragment replicas, and the standby replicas are updated using transaction log records. Every node of the system includes a data dictionary that stores information indicating where each primary and standby fragment replica is stored. The fragments are allocated as evenly as possible among the system nodes using a fragment to node assignment equation. A transaction manager on each node responds to database queries by determining which fragment of a database is being accessed by the query and then forwarding the database query to the node processor on which the primary replica of that fragment is stored. Upon failure of any one of the data processors in the system, each node updates the information in its data dictionary accordingly. In addition, the fragment replicas made unavailable by the node failure are regenerated and stored on the remaining available nodes in the same node group as the failed node.

7 Claims, 9 Drawing Sheets

OTHER PUBLICATIONS

Ceri et al., "Distributed Databases Principles And Systems", 182, ©1984.

Hvasshovd, Saeter, and Torbjornsen, "Critical Issues In The Design Of A Fault Tolerant Multiprocessor Database Server"; Proceedings Pacific Rear International Symposium On Fault Tolerant Systems, 25–27 Sep. 1991, pp. 226–231 (IEEE).

Du, X. and Maryanski, F., "Data Reorganization In A Dynamically Reconfigurable Environment"; 8th International Conference On Distributed Computing Systems, IEEE, 13–17 Jun. 1988, pp. 463–470.

CONTINUOUSLY AVAILABLE DATABASE SERVER HAVING MULTIPLE GROUPS OF NODES WITH MINIMUM INTERSECTING SETS OF DATABASE FRAGMENT REPLICAS

This application is a continuation-in-part of application Ser. No. 08/336,331, filed Nov. 8, 1994, entitled CONTINUOUSLY AVAILABLE DATABASE SERVER HAVING MULTIPLE GROUPS OF NODES, EACH GROUP MAINTAINING A DATABASE COPY WITH FRAGMENTS STORED ON MULTIPLE NODES, now U.S. Pat. No. 5,423,037, which was a continuation of application Ser. No. 07/852,669, filed Mar. 17, 1992 and now abandoned.

The present invention relates generally to database server computer systems using multiple interconnected computers to provide continuous, reliable transactional services.

BACKGROUND OF THE INVENTION

In a variety of commercial contexts it is very important for a database transactional server to be continuously available, twenty-four hours per day, without interruption. For instance, the database server used to accumulate toll charges and other billing information for a telephone system must have a level of reliability similar to that of the telephone system itself. While most fault-tolerant computer systems are only single-fault tolerant, in order to have the level of reliability required for a telephone charge database or an airline reservation system, the database server should also have fast, automatic self-repair to re-establish the original fault tolerance level. In the context of the present invention, self-repair means that all of the data storage and transaction handling responsibilities of the failed node are transferred to other nodes in the database server system. Completion of the self-repair process must re-establish single fault tolerance. Thus, not only must no single hardware failure be able to cause the entire system to fail, even a second hardware failure should not be able to cause the entire system to fail.

Due to the requirement of continuous availability, the self-repair process should be non-blocking, meaning that database server remains continuously available (i.e., able to continue servicing transactions) while the self-repair is being performed.

In addition to continuous availability, another desirable feature for high reliability database servers is graceful degradation with respect to data availability when multiple failures occur. In other words, even if multiple failures should cause some data records to be unavailable, the database server should still continue to service transactions that do not need to access the unavailable data.

One common method of providing reliable computer operation is to use "fault tolerant" computer systems, which typically have redundant components. However, most fault tolerant computer systems can only handle one hardware component failure in a short period of time, and also, most such systems are vulnerable to failures of peripheral equipment such as power failures and communication network failures. It is the object of the present invention to overcome these shortcomings, and to provide a highly reliable database server that is single fault tolerant, has automatic non-blocking, self-repair that quickly re-establishes single fault-tolerance after a first node failure, and provides graceful degradation with respect to data availability when multiple failures occur.

SUMMARY OF THE INVENTION

In summary, the present invention is a database server computer system having multiple data processors, also called nodes. Using a "shared nothing" system architecture, each data processor has its own central processing unit, primary and secondary memory for storing database tables and other data structures, and communication channels for communication with other ones of the data processors. Some or all of the data processors include a communications processor for receiving transaction requests and for transmitting responses thereto. To prevent any one hardware failure from causing the entire system to fail, the data processors are divided into at least first and second node groups, wherein each node group shares no resources, including power supply and cooling system components, with the other groups.

Each database table in the system is divided into N fragments, where N is the number of data processors in the system. The records of the database table are allocated as evenly as possible among the table fragments, for example, by hashing a primary key value for each record with a predefined hash function and using the resulting value to select one of the database table fragments. A "primary replica" of each fragment is stored on a corresponding one of the data processors. For each primary fragment replica, the system also generates at least one standby replica, which is essentially a copy of the fragment's primary replica. Database transactions are performed using the primary fragment replicas, and the standby replicas are updated using transaction log records. To ensure continued data availability even after a single node failure, the primary and standby replicas for each database table fragment are stored in data processors in different ones of the first and second node groups.

Every node of the system includes a data dictionary that stores information indicating where each primary and standby fragment replica is stored among the system's data processors. A transaction manager on each system node responds to database queries by determining which fragment of a database is being accessed by the database query and then forwarding the database query to the data processor on which the primary replica of that fragment is stored.

Upon failure of any one of the data processors in the system, each node changes the information in its data dictionary (A) to indicate that the primary and standby fragment replicas stored on the failed data processor are not available, and (B) to indicate that for each primary fragment replica stored on the failed data processor, the corresponding standby replica is to be used in its place. In addition, the fragment replicas made unavailable by the node failure are regenerated from the other replicas thereof in the system and stored in subfragments on the remaining available nodes of the database server. Thus the data replicas made unavailable by a node failure are redistributed over the remaining available nodes. The replica regeneration process is non-blocking, allowing the database server to continuously service transactions even during self-repair of the database server.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
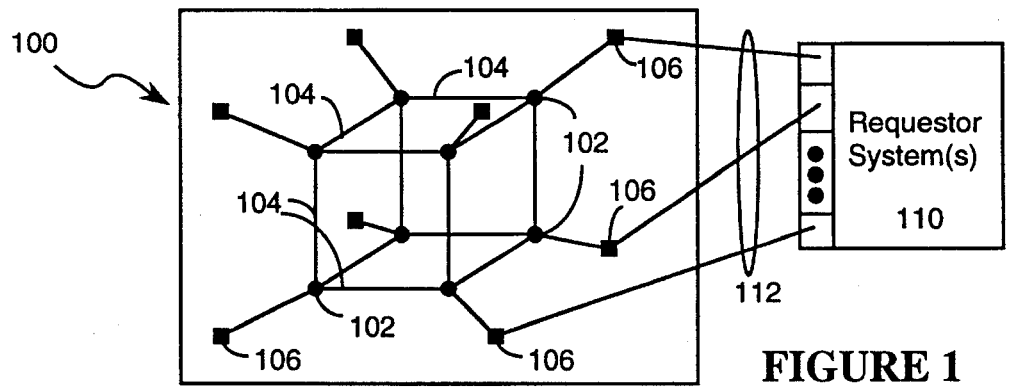
FIG. 1 is a block diagram of a multiprocessor computer system having nodes that are interconnected by a multi-path hypercubic communication network.

Referring to FIG. 1, there is shown a multiprocessor database server 100 having eight data processors 102, often called nodes, interconnected by a multi-path hypercubic communication network 104. The number of data processors shown in this example is eight or $2^3$, corresponding to a three dimensional hypercube. The communication network 104 includes all the communication paths between nodes 102 shown in FIG. 1. In an N dimensional hypercube, each node has direct connections to N neighboring nodes.

Multiple ones of the data processors 102 have a communications co-processor 106 for external communications so that the failure of any single one of these communications co-processors does not cause the database server 100 to become unavailable. The database server 100 responds to queries received from requestor systems 110 via communication connections 112 that couple those requestor systems to communication co-processors 106. In the preferred embodiment, at least one data processor 102 in every group of four data processors is coupled by a communication co-processor and communication connection 112 to an external host computer.

The number of processors used can be scaled up or down to fit the data processing needs of any particular application. It is preferred, but not necessary, to use hypercubic architectures having $2^J$ data processors interconnected in a hypercubic communication network, with J being an integer greater than or equal to three. More generally, the database server 100 should have a symmetric set of nodes on each side of the system's "mirror dimension".

Many aspects of the invention can be implemented using as few as $2^2$ (i.e. four) processors. However, a system with just four nodes will not be able to achieve the preferred level of fault tolerance following a single node failure.

Figure 2:
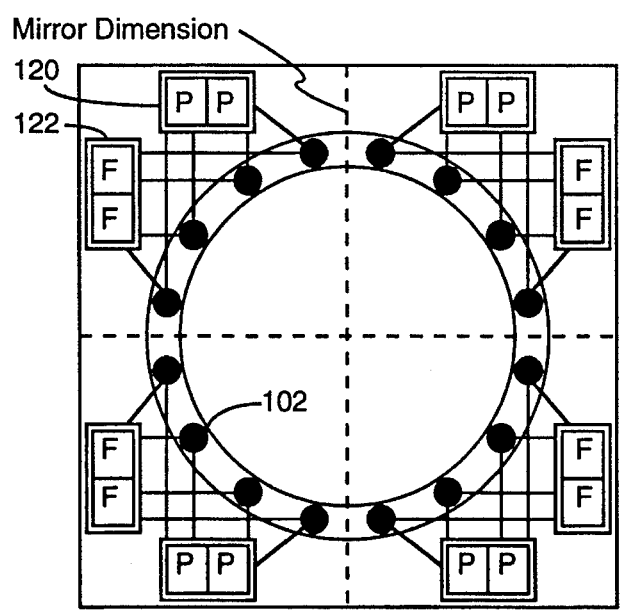
FIG. 2 is another block diagram of the multiprocessor computer system of FIG. 1.

Referring to FIG. 2, a system with sixteen data processors 102 is divided into two groups of eight processors, half on each side of the computer system's "mirror dimension" as shown. To ensure fault tolerance, the database server system uses multiple, homogenous powerful nodes with a high degree of node isolation. In particular, a "shared nothing" hardware architecture is used, meaning that neither primary memory nor disks are shared between nodes. Neither primary nor secondary memory can be shared in a database server with fault masking capabilities because memory is a critical component used by servers at all nodes.

In the preferred embodiment of FIG. 2, the sixteen data processors 102 are divided along two dimensions into four groups. Each group shares a pair of power supply units 120 and a pair of cooling fans 122, each pair of power supply units and cooling fans providing single fault tolerance. As will be described in more detail below, in order to provide multi-fault tolerance and fault masking, it is important that the processors on each side of the mirror dimension be divided into at least two distinct groups that share no resources whatsoever. It is for this reason that the data processors 102 are divided into sub-groups on each side of the mirror dimension in FIG. 2.

Figure 3:
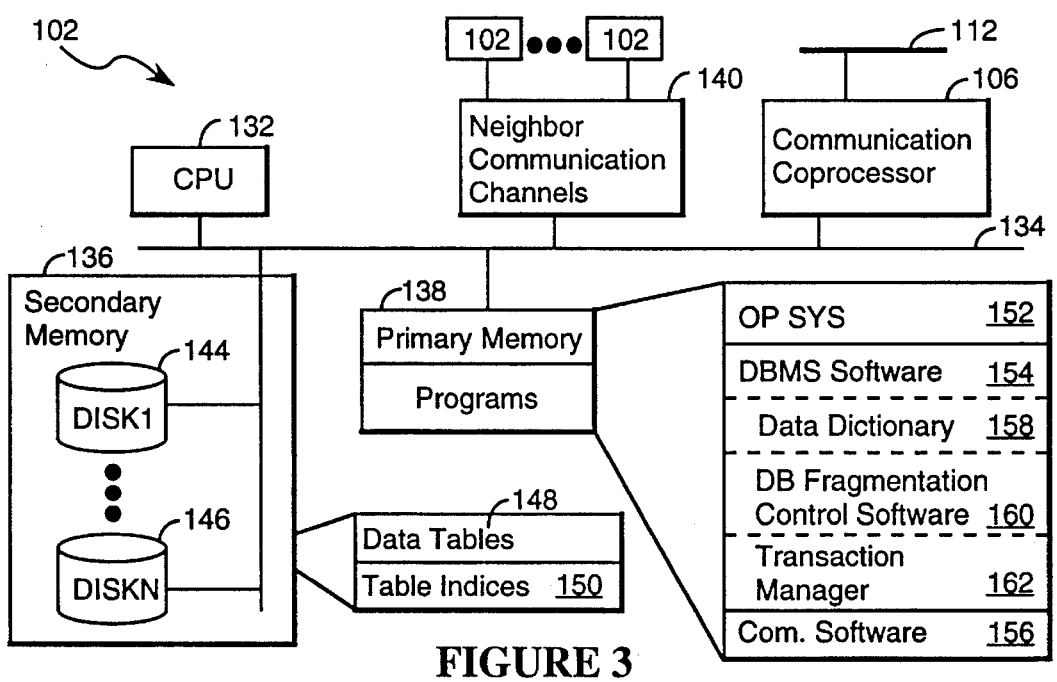
FIG. 3 is a block diagram of one processor in the multiprocessor computer system of the present invention.

Referring to FIG. 3, each data processor 102 in the preferred embodiment has a central processing unit (CPU) 132 such as the i486 microprocessor made by Intel, a system bus 134 that connects the CPU 132 to secondary memory 136 (e.g., magnetic disk storage devices), and primary memory 138 (i.e., high speed, random access memory). Every data processor 102 also has a multiplicity of parallel communication channels 140 for communication with at least two other data processors 102 in the system. At least one data processor in each node group (see FIG. 2) includes a communications co-processor 106 for receiving transaction requests from requestor systems via a communications bus 112 and for transmitting responses thereto.

The secondary memory 136 will typically contain a number of disk storage devices 144–146 that are used to store data and programs (e.g., a set of precompiled transactions). In database servers with very high transaction handling rates, multiple disk storage devices are required because of the limited data handling capabilities of any single one device, and because of the large amounts of data to be stored. In the present invention, secondary memory 106 is used to store portions (herein called fragments) of data tables 148, as well as corresponding table indices 150.

Stored in primary memory 138 are currently executing programs, including the node's operating system software 152, database management system (DBMS) software 154, and communication control software 156. In the preferred embodiment, the DBMS software 154 includes a data dictionary 158, database fragmentation control software 160, and a transaction manager 162. A copy of the data dictionary is also maintained on disk (secondary memory 136). As will be described in more detail below, the data dictionary 158 is used to determine the location of various fragments (portions) of any specified database table, and the database fragmentation control software 160 controls the process of fragmenting database tables, masking node failures, making extra replicas of database fragments, and reconstructing database fragments on nodes after a failure recovery.

Database Fragments and Replicas

Figure 4:
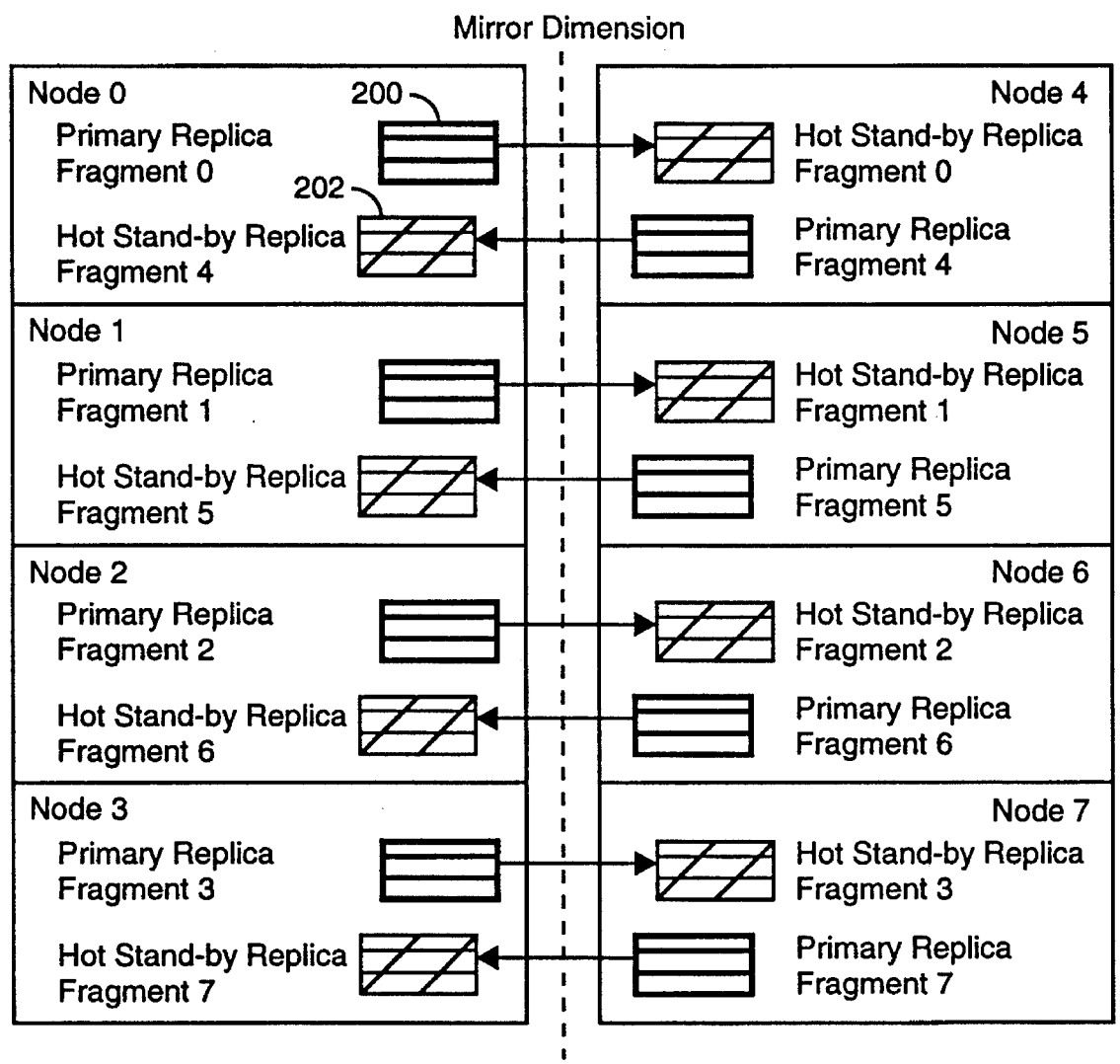
FIG. 4 is a block diagram showing fragmentation of a single database table in accordance with the present invention.

Referring to FIG. 4, for the purposes of explaining database table fragmentation, we will use as an example a system having eight nodes. Every database table is fragmented over the system nodes, and the number of fragments of each table corresponds to the number of nodes in the system. FIG. 4 shows the fragments for one database table, labelled as Primary Replica fragments 0 to 7 and Hot Standby Replica fragments 0 to 7. Each table fragment, such as primary replica fragment 200, represents a portion of the records in a table. The records in a database table are allocated to the various fragments as evenly as possible so as to spread the data storage and transaction handling load as evenly as possible among the system's nodes.

The term "record" as used in this document is defined to be synonymous with the term "tuple" often found in database computer science literature. A record or tuple is defined as a unit of data uniquely identified by a key value.

In the preferred embodiment, records of a table are allocated among the fragments using a hash function such as:

$$v = k \text{ modulo } n$$

where k is the key value associated with the record, n is the number of fragments, and v is the result from the hashing that is used to select the record's fragment. v will always have a value between 0 and n−1. For example, if the key value for a record is 15 and n=8, then the record belongs in fragment 7.

As new records for a table are created, they are stored in the node that stores the corresponding table fragment.

In the present invention, each table fragment has between two and four replicas. The example in FIG. 4 shows just two replicas 200 and 202 for each table fragment. One of the replicas is called the primary replica, a second one is called the hot standby replica, and any additional replicas are called "additional read only replicas". Increasing the number of table replicas increases the level of fault tolerance provided.

An important pad of the replica allocation strategy of the present invention is that two replicas of a data record must never be dependent on the same software or hardware servers. The fragment replicas are therefore stored at nodes within different node groups. In particular, the primary and first hot standby replicas of a fragment are always stored in nodes on opposite sides of the system's mirror dimension, thereby ensuring that both replicas are not dependent on the same power supply or cooling fan units. If a third replica is provided, the third replica is always stored in a node group different from the node groups in which the primary and hot standby replicas are stored.

During "normal" operation, when all nodes of the database server system are operational, database operations are performed using the primary fragment replicas. The records in the hot standby replica fragments are kept up to date by sending all log records produced by transactions from the node with the primary replica to the node with the corresponding hot standby replica. The serialized log records are read and the corresponding table records updated at the node of the hot standby replica as an ongoing activity. More particularly, operations represented by the log records are repeated at the node of the hot standby replica after checking the data table to make sure that those operations have not already been performed, which can be the case when a table has been refragmented or rebuilt.

Figure 5:
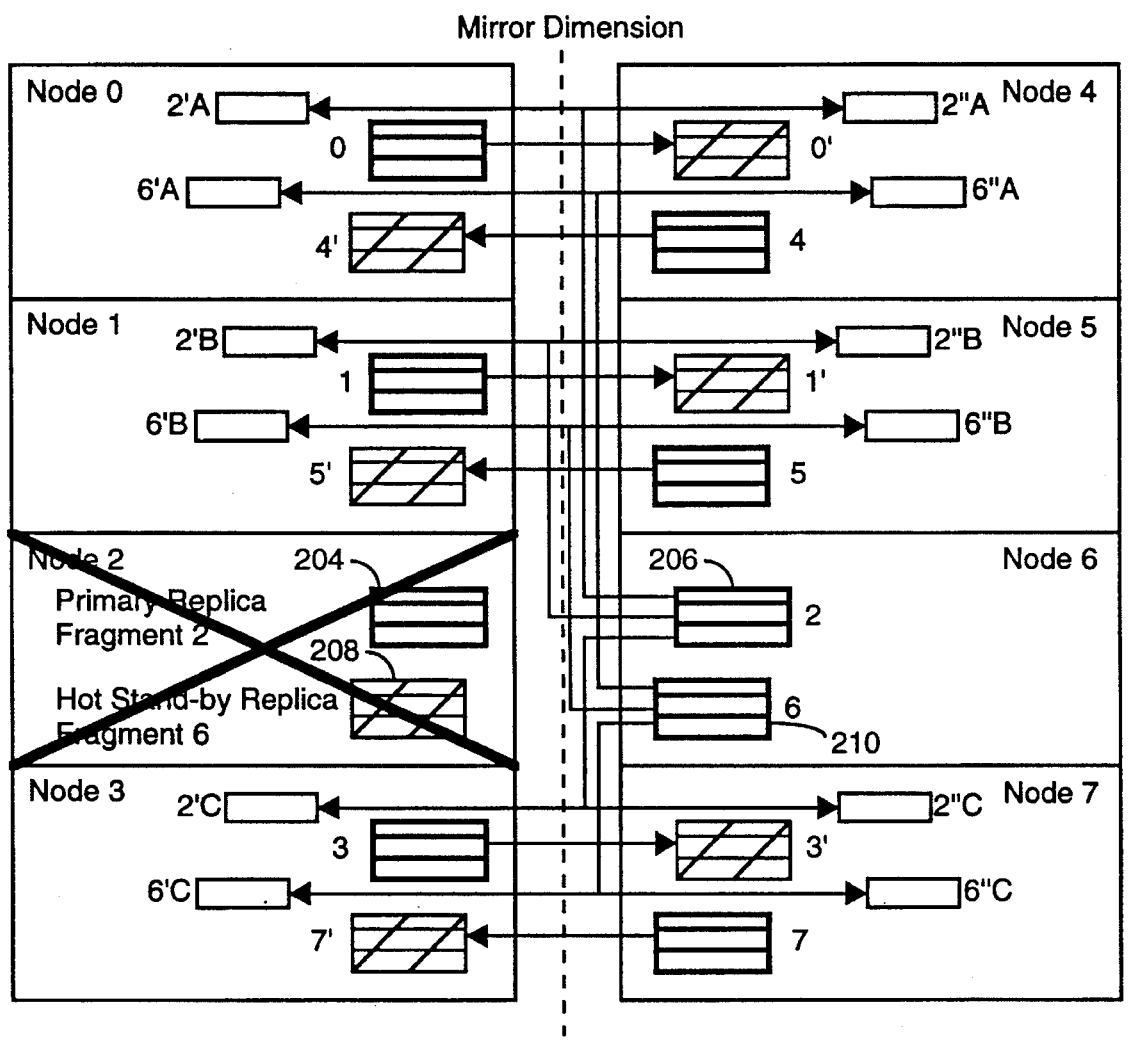
FIG. 5 is a block diagram showing a redistribution of database table fragments after a single node failure.

Referring to FIG. 5, when a node such as Node 2 of the system fails, the system performs an automatic non-blocking, corrective on-line repair that masks the occurrence of single node failures. For each table fragment replica that becomes inaccessible due to a node or disk failure, a new replica is produced on each side of the mirror dimension. While this repair activity takes place, the system is vulnerable to a second node or disk failure. After the repair is done the system is again single fault-tolerant.

When one fragment replica of a table becomes unavailable, the unavailable fragment is refragmented into a collection of subfragments. More specifically, when a primary fragment replica such as fragment 204 in FIG. 5 becomes unavailable, the corresponding hot standby replica fragment 206 is promoted to primary replica status. Then, using the still available replica 206 of the fragment, the data records in the fragment are copied into new subfragments 2'A, 2'B and 2'C that are stored on the remaining available nodes on the same side of the mirror dimension as the failed node. Simultaneously, replicas 2"A, 2"B and 2"C of those subfragments are generated and stored on the corresponding nodes on the other side of the mirror dimension. When a hot standby fragment replica such as fragment 208 in FIG. 5 becomes unavailable, the corresponding primary replica fragment is used to generate new subfragments 6'A, 6'B and 6'C that are stored on the remaining available nodes on the same side of the mirror dimension as the failed node, as well as replicas 6"A, 6"B and 6"C of those subfragments on the other side of the mirror dimension.

One subfragment is allocated to each available node in order to distribute the reallocated data and the added transaction workload over as many nodes as possible. Once all the subfragments for a particular table fragment have been built, the remaining higher level fragment (i.e., in Node 6) is no longer used as the primary fragment replica for handling transactions. Instead, the new subfragments on the same side of the mirror dimension as the primary fragment replica are now given the status of "primary". In the example shown in FIG. 5, the table fragments 206 and 210 are no longer used after the subfragments have been built, and instead subfragments 2'A, 2'B and 2'C are used as the primary (sub)fragments in place of primary fragment 2, and subfragments 6"A, 6"B and 6"C are used as the primary (sub)fragments for transaction processing in place of primary fragment 6. As a result, once all the affected table fragments have been subfragmented, node 6 is essentially dormant until the failed node 2 is restarted.

If further node failures occur after the above described repair has taken place, a subfragment may be further refragmented. The same policies with respect to fragmentation, allocation and primary replica determination are used as for a first level subfragment. Data for each subfragment is kept in separate files to reduce the read and written data volumes when a replica is built and erased.

One exception to the above described method of handling multiple node failures is that if the second node failure is on the same side of the mirror dimension as "dormant" node 6, then table fragments in the second failed node can be rebuilt on node 6, and node 6 can then be used in place of the second failed node. For instance, if node 5 were to fail after completion of the self-repair caused by the failure of node 2, then the fragmentation control software would copy all the table fragments from node 1 onto node 6, and then use node 6 in the place of node 5.

In one preferred embodiment, the following hash function is used to determine the fragment to which each database record is allocated:

$$\text{hash } (k,n) = \langle v, r \rangle = \langle k \text{ modulo } n, \lfloor k \div n \rfloor \rangle$$

where k is the key value associated with the record, n is the number of fragments, v is the result (with a value between 0 and n−1) from the hash function, and r is an independent value for recursive use of the hash function. In the above expression, the division operator "÷" is surrounded by operators "⌊" and "⌋" to indicate that the result of the divide operation is rounded down to closest integer. A given database record can be found by applying the hash function to the record's key value k and the number of fragments n. The value of v determines which level 1 fragment the record belongs to. If the level 1 fragment has been subfragmented, the value r is used as the new key value that is hashed to determine the correct level 2 subfragment. This process is continued recursively until a fragment with replicas is found, and then the record is accessed from the primary replica.

During successive iterations of the above hash function to locate a record in a database table, the value of n in the above hash function is equal to the number of subfragments into which a fragment of the table has been divided. Typically, the value of n during successive iterations is assigned a sequence of values such as n0=total number of nodes in system n1=(n0/2)−1 n2=n1−1 n3=n2−1

An alternate, "linear" hash function that could be used for locating records within table fragments and subfragments is:

$$hash_L(k,n) = <v,r> = <\lfloor n(k-L) \div (U-L+1) \rfloor, N(k-L)) \text{ modulo } (U-L+1) + L>$$

where the value of n is equal to the number of fragments or subfragments over which a table or table fragment is being distributed, and k is a key in the range [L, U]. This function divides the range of key values into equal sized intervals, and assumes that the key values k are homogeneously distributed over the value range L to U. "v" is the result (with a value between 0 and n−1) from the hash function, and r is an independent value for recursive use of the hash function.

For example, if key value k for a particular record is equal to 1377, all key values for the table fall in the range [1000, 1999], and n=5 on the first level and n=4 on the second level of hashing, then $hash_L(k,n)$ is evaluated as follows:

$$hash_L(1377,5) = <\lfloor 5 \cdot 377 \div 1000 \rfloor, 5 \cdot 377 \text{ modulo } 1000 + 1000>$$
$$= <1, 1885>$$
$$hash_L(1885,4) = <\lfloor 3540 \div 1000 \rfloor, 3540 \text{ modulo } 1000 + 1000>$$
$$= <3, 1540>$$

Thus, the record with key value 1377 is allocated to node 1 at the first fragment level, and to the third node at the second fragmentation level.

A "fragment crash" occurs when both the primary and the hot standby replicas of a fragment or subfragment become unavailable, typically due to a node or disk failure. The crashed fragment becomes unavailable, but other fragments of the table remain available. Therefore, a fragment crash results in "omission failures" for only those transactions trying to access data records belonging to the failed fragment.

A gradual reduction of data availability is provided for subfragments as well as for fragments. If all replicas of a subfragment, or the fragment replicas containing the subfragment become unavailable, the subfragment is said to be crashed. For instance, referring to FIG. 5, if nodes 1 and 6 failed after the failure of Node 2 and after the resulting refragmentations were completed, then subfragments 2'B and 6'B would become unavailable, but the remainder of the database table would still be available.

When a previously failed node is restarted, data is again redistributed to obtain an approximately even distribution of data among the available nodes. The redistribution is performed on a per table basis to preserve the serializability of the redistribution operation, and also to restrict the workload induced by the redistribution activity so as to limit its impact on the timely servicing of database transactions. When data in the restarted node is available (i.e., the disk and file in which the table was stored were not lost), the restarted replica, which is assigned the role of a hot standby replica during the table rebuilding process, is produced using the state of the restarted replica at the point that the replica's node failed, plus the log records accumulated by the primary replica during the time that the failed node was unavailable.

When data in the restarted node is not available, or is so old that it does not meet timeliness criteria (e.g., restarting the node within 24 hours of a node failure), the restarted replica is rebuilt from scratch by copying the primary replica, and then using log records accumulated by the primary replica during the coping progress to ensure that the records in the restarted replica are consistent. In other words, because the copying process takes time, all data updates during the time occupied by the copying progress are repeated to ensure that the restarted replica is in a consistent state.

In the preferred embodiment, the nodes have sufficient computational power and inter-node communications bandwidth, above that needed for normal transaction processing loads, that all the table subfragmenting initiated by a node failure can be accomplished in approximately fifteen minutes, assuming that each node stores on the order of one to five gigabytes of data. It is important that the self-repair process be completed quickly, preferably in less than an hour, in order to reduce the likelihood that a second node might fail before a prior node failure is repaired. The "excess" computational and communications capabilities provided in order to make fast self-repair possible can be used during normal operations for activities such as computing and comparing the transactional and data storage loads on the system's nodes, and redistributing data among the nodes (by selecting a new hash function and then fragmenting the data tables and distributing the data among the nodes using that new hash function) when transactional or data storage loads are imbalanced.

Making the self-repair process non-blocking is accomplished by locking down only the pages of a data table that are currently being replaced while they are being read. Each page is therefore locked by the self-repair process only for a very brief time. Thus, the progress of transactions is not blocked by the self-repair process. A consistent version of each fragment replica is generated by sending to the new fragment replica, along with the copied pages of the data table, a copy of (A) all log records created for that fragment, beginning at the time that the copying process began, and (B) all "undo" log records that may be needed to reverse data table changes made by aborted transactions. Undo records are needed only for long running transactions in progress at the time the process of generating the new fragment replica begins.

Data Dictionary

Figure 6:
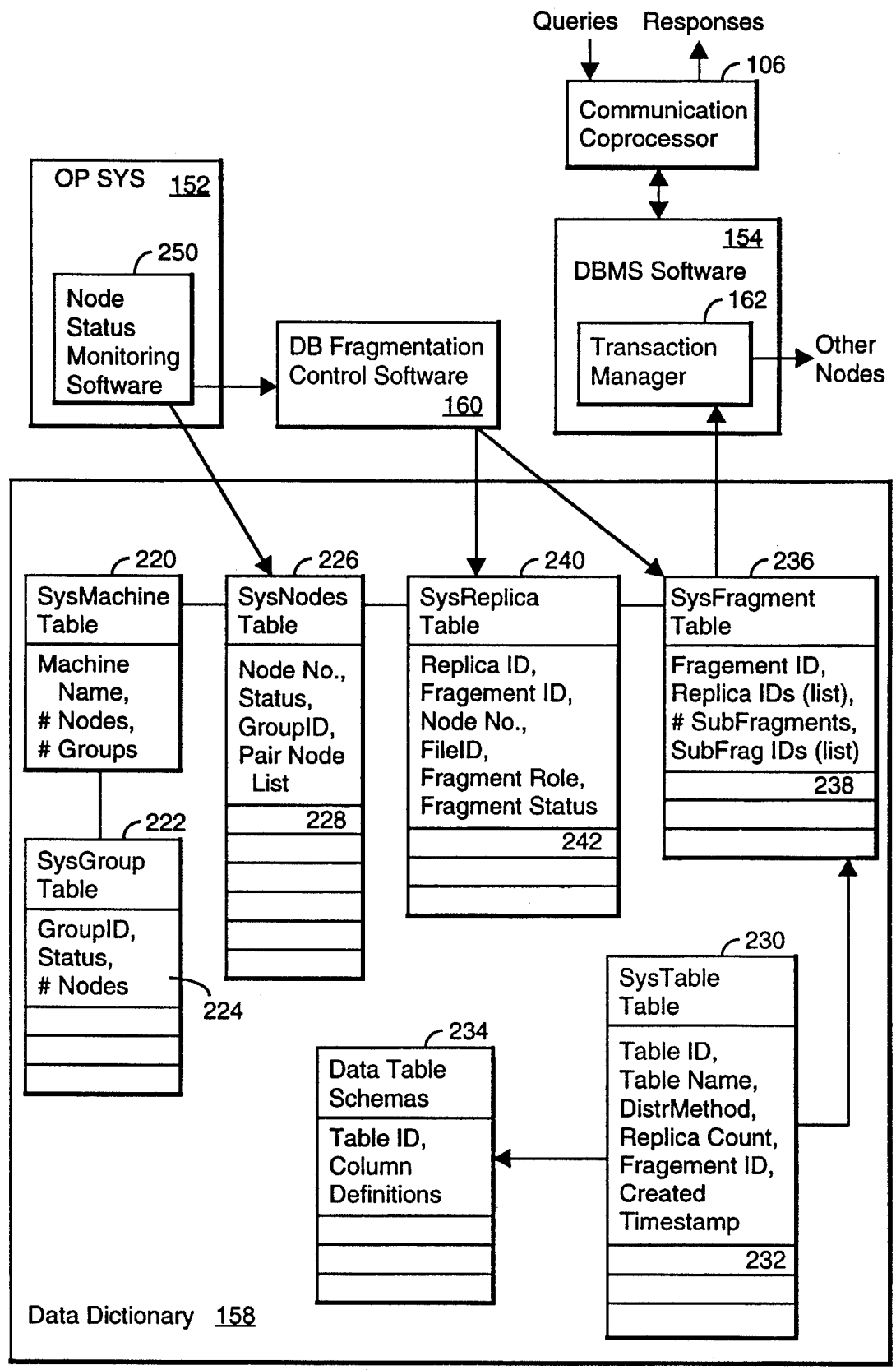
FIG. 6 depicts relationships between software modules and data structures used in a preferred embodiment of the present invention.

Referring to FIG. 6, a copy of the data dictionary 158 is stored on every node of the system. The purpose of the data dictionary is to store all the information necessary to determine the current configuration of nodes in the system and to find any identified record in any identified data table. In particular, the data dictionary 158 comprises a set of "system" tables, the purpose and structure of which are explained next. The SysMachine Table 220 has just one record, which provides the name of the database server system, the number of nodes (i.e., data processors) in the system, and the number of data processor groups, also herein called node groups, in the system. As explained above, node groups are totally independent of each other insofar as hardware failures are concerned. The SysGroup Table 222 has one record 224 for each group of data processors. That record 224 indicates the group's Group ID, its status (e.g., running or unavailable), and a count of the number of nodes in the group.

The SysNodes Table 226 has one record 228 for each node in the system. Each record 228 indicates the node's node number, its status (e.g., running, restarting, isolated, or dead), the Group ID of its group, and a list of "pair nodes" in other groups that are preferred for table replication.

The SysTable Table 230 has one record 232 for each data table in the system. The record 232 for any particular table lists its Table ID, table name, a "replica count" that indicates the numbers of replicas of the table that exist in the system, the top level "Fragment ID" that corresponds to an entry in the SysFragment Table 236, the "distribution method" for locating the fragment associated with a specified record, the table's level 0 Fragment ID, and a timestamp indicating when the table was created. The "distribution method" is typically (1) one of two or more predefined hash functions, (2) "linear," indicating that the fragment containing a particular record is located by hashing the key value for the record with a linear hash function, or (3) "RoundRobin", indicating that the records in this table are assigned to fragments in a "round robin" fashion. The "RoundRobin" distribution method is used only for low usage tables because a transaction using records in such tables must be sent to all the nodes in order to find the one in which the queried record is located.

Note that the Replica Count field for each table is a value assigned to each data table either by the table's creator or by an operating system policy, such as a policy that assigns every data table two replicas unless that assignment is explicitly overridden by a system operator.

Another table in data dictionary, called the Data Table Schemas table 234, stores the column definitions for each data table, often called table schemas.

The SysFragment Table 236 has a separate record 238 for every fragment and subfragment of every data table in the system. The record 238 for each table fragment contains the fragment's Fragment ID, an ordered list of the fragment's Replica IDs, a count of the number of subfragments at the next level of subfragmentation of the table, an ordered list of the Fragment IDs for those subfragments. Since table "fragments" are identified in the preferred embodiment as a value between 0 and n−1, where n is the number of fragments in any particular set, "an ordered list" in this context means that the Fragment IDs in the subfragment list are ordered so that the first Fragment ID in the list is for Fragment 0, the second Fragment ID in the list if for Fragment 1, and so on.

Similarly, if a particular data table has M replicas (as specified in the Replica Count field of the SysTable Table 230), then the Replica ID list will contain M Replica IDs for Fragment 0, followed by M Replica IDs for Fragment 1, and so on. Furthermore, in the preferred embodiment, the first Replica ID in the Replica ID list for a particular fragment is the Replica ID for the primary replica, the next Replica ID in the list is for the hot standby replica, and any additional Replica IDs in the list are for additional read only replicas.

The purpose of the SysReplica Table 240 is to store data representing the location and status of each data table fragment replica. For each fragment replica there is a separate record 242 in table 240 that indicates (A) the fragment replica's Replica ID and Fragment ID, (B) the node on which the fragment replica is stored and the file ID for the file in which it is stored, (C) the role of the fragment replica, such as "primary," "hot standby," or "additional read only copy," and (D) the status of the fragment replica, such as "available," "void," or "refragmenting".

The data dictionary 158 may also include other tables not relevant herein, such as tables for storing security or data access control information, tables for indicating the "views" and indices used in conjunction with each data table, and so on.

Whenever a database query is received by a node in the database server system, a transaction manager 162 in the database management system (DBMS) software 154 searches the SysTable Table 230 to find the Fragment ID for the applicable Database and the record Distribution Method for that table. The key value for the record being accessed by the query is hashed or otherwise reduced to a fragment number in accordance with the Distribution Method, and then the transaction manager 162 searches the SysFragment and SysReplica Tables 236 and 240 to find the primary fragment replica corresponding to the record being accessed and the Node number on which the primary fragment replica is located. Finally, if the node on which the primary fragment replica is located is not the node that received the query, the transaction manager 162 forwards the query to the appropriate node via the hypercubic communication network.

The DBMS software 252 at the node that receives the forwarded query (or at the original node if the query did not need to be forwarded) executes the query, creates log records indicating data table records changed by executing the query, and forwards a copy of each log record to the data processor(s) on which is stored the standby (or other additional) replica of the effected database table fragment. The DBMS software 252 at the node that receives the log record copy updates the standby replica of the effected database table fragment in accordance with the information in the received log record copy.

In practice, the initial entries in the data dictionary 158 are made at the time the system is first put into service. Typically, very few new data tables are created after the system is first put into service, and the number of nodes in the system is changed infrequently. As a result, the only tables in the data dictionary that undergo changes on a regular ongoing basis are the SysFragment and SysReplica Tables 236 and 240. If the data dictionary 158 includes tables with data access control information and tables with information regarding the various procedures used to access data, those data dictionary tables may also undergo frequent changes, but those tables and their operation are not relevant here.

When all the nodes of the database server system are operating normally, and there have been no node failures in the recent past, each data table has just two levels of entries in the SysFragment Table 236: a top level fragment entry for the entire table, and one entry for each fragment of the table. The top level (called level 0) entry lists all the subfragment IDs for the table fragments, and each of the next level entries indicates that it has zero subfragments and lists only the replica IDs for the corresponding level 1 table fragment.

In reality, a heavily used system with sixteen or more data processors that are in use 24 hours per day will typically suffer node faults in random fashion. For instance, a particular system might average one node failure per week, but only once every thirty years or so will two or more nodes fail within a few (e.g., fifteen) minutes of each other, and occasionally there may be a power supply failure that causes four nodes to fail simultaneously.

Node failures are detected by neighboring nodes using a signalling protocol (Node Status Monitoring Software 250 in FIG. 6) that requires that each node to send its neighbors predefined signals, sometimes called "I'm alive" signals, on a periodic basis (e.g., once per millisecond). Each node is connected to several neighboring nodes, for example in accordance with the hypercubic interconnection scheme of the preferred embodiment. When a node fails to receive the expected periodic signals from one of its neighbors, a predefined status verification procedure is executed that attempts to communicate with the neighboring node and then declares the neighboring node to be unavailable if its attempts are unsuccessful. Such procedures are well known to those skilled in the art. One added feature of the node status monitoring procedure 250 that is useful in the present invention is that the status checking procedure checks the status of all nodes in a group, for the purpose of detecting group failures, any time that two or more nodes from the same node group are detected to have failed.

When a node determines that one its neighboring nodes is not available, it sends a node-failure message to all its neighbors, which in turn retransmit the node-failure message to their neighbors until the "wavefront" of messages reaches all the nodes in the system. The functional nodes in the system which receive the node-failure message send acknowledgement messages back to node which originated the node-failure message. After collecting all such acknowledgements, the originating node then sends out a "new configuration" message to all the nodes in the system indicating the set of functional nodes in the system.

Each node that is still operational responds to the new configuration message by invoking the fragmentation control software 160 (present on every node), which then causes the following sequence of steps to be performed. First, the node inspects its own data dictionary to determine which data tables are affected by the node failure(s) and which new table subfragments will have to be created and stored at that node. At each operational node, fragment replicas status values are updated in the data dictionary. For example, for each primary fragment replica that resided on the failed node, the fragment status is changed to "refragmenting", and the corresponding hot standby fragment replica is given the role of "primary". Each node then creates the files necessary for storing the new subfragments assigned to that node (in accordance with the system's predefined refragmentation procedures in the fragmentation control software 160), sends messages with that information to the other nodes so that all the nodes can update their data dictionaries accordingly, and then goes through the process of creating each new subfragment replica that is to be stored at that node. As the process of generating each new subfragment replica is completed, its status is changed to "available" and a message to that effect is sent to all the other nodes. This process continues until all the new subfragment replicas have been built. In general, each node modifies its own data dictionary entries in accordance with the status messages received from other nodes. Because every node has the same fragmentation control software 160 for data table refragmentation and for data table rebuilding (after a failed node comes back on line), there is no need to coordinate activities between nodes other than the transmission of status messages.

After the system has responded to a node failure, the process of accessing data records is impacted by the changed fragment and replica records in the data dictionary. In particular, more levels of the SysFragment and SysReplica Tables may have to be searched to find the node to which a transaction should be sent. In addition, additional levels of these system tables may need to be searched when determining the nodes to which copies of the log records for a transaction should be sent (for the purpose of keeping hot standby and other replicas up to date).

When a failed node is repaired, the above described fragmentation process is reversed. In particular, the repaired node goes through a process of rebuilding its data table fragment replicas, and sends status messages to all the other nodes as each recovered table fragment replica is ready to resume its normal role. The other nodes update their data dictionary entries accordingly, and also delete subfragment replica files no longer needed.

When an entire group of nodes fails simultaneously, such as when a power supply failure occurs, the subfragmentation procedure is essentially unchanged, except that the number of target nodes for the new subfragments is reduced. In the preferred embodiment, to ensure that no single group failure can cause data to be unavailable, each half of the system has at least two separate groups of nodes that share no resources with the other node groups. As a result, when a group of nodes fails, at least one copy of every table fragment can be found elsewhere in the system, enabling a new replica thereof to be generated.

Minimum Intersecting Sets Declustering

The following portion of this document describes database fragmenting and fragment replica regeneration schemes used in three preferred embodiments of the database fragmentation control software 160.

The general concept of Minimum Intersecting Sets Declustering (MISD) is as follows. Relations (i.e., database tables) are partitioned into a high number of fragments. Each fragment is initially created with one replica for each site. A "site" is herein defined to mean a set of nodes treated as a group that are remotely locate a from other sites and that share no resources, including power supply and cooling system with the nodes at the other sites.

Inside a site, fragment replicas are assigned evenly over the nodes. The fragments assigned to a node form a "fragment set." The sets should be assigned such that the maximum cardinality of the intersection between any pair of fragment sets (i.e, one set from each of two distinct sites) is minimized. In case of a node failure the lost fragment replicas are moved to other fragment sets on the same site.

In the preferred embodiment, the number of fragments is at least two times the number of nodes at each site on which the fragments are to be stored.

The intersection of two fragment sets is defined for the purposes of this document to be the set of fragments the two sets have in common. If a node fails, the nodes having intersecting fragment sets have to take over all work on the common fragments. A smaller intersection means less common fragments and therefore also less added load in a failure situation. By using a fragment replica location assignment scheme that requires a "minimum largest intersection cardinality," the worst case added load to any node is minimized, thereby reducing the overcapacity required to mask errors.

The terms "dedicated spare" and "spare node" are used in this document to mean a node which is unused for fragment replica storage when all nodes at the site of the spare node are functioning properly, and which is used to store replacement fragment replicas when a non-spare node at the site fails.

The term "distributed sparing" is used in this document to mean the storage of replacement fragment replicas on nodes normally used to store other fragment replicas when the node on which the corresponding fragment replicas fails. When using this technique, all the nodes at each site have the capacity to store and service at least one more database fragment replica than the number normally stored and services at those nodes.

In FIGS. 7A–7E, database fragments shown with no cross hatching are primary replicas, while fragments shown in diagonal cross hatching a hot standby replicas. In these Figures the term $F^x_y$ refers to a replica of fragment y at site x. Thus the terms $F^0_2$ and $F^1_2$ refer to two replicas of the same database table fragment stored at sites 0 and 1, respectively. Similarly, the term $N^s_z$ refers to node z at site s. For example, the term $N^0_3$ refers to node 3 at site 0.

Figure 7A:
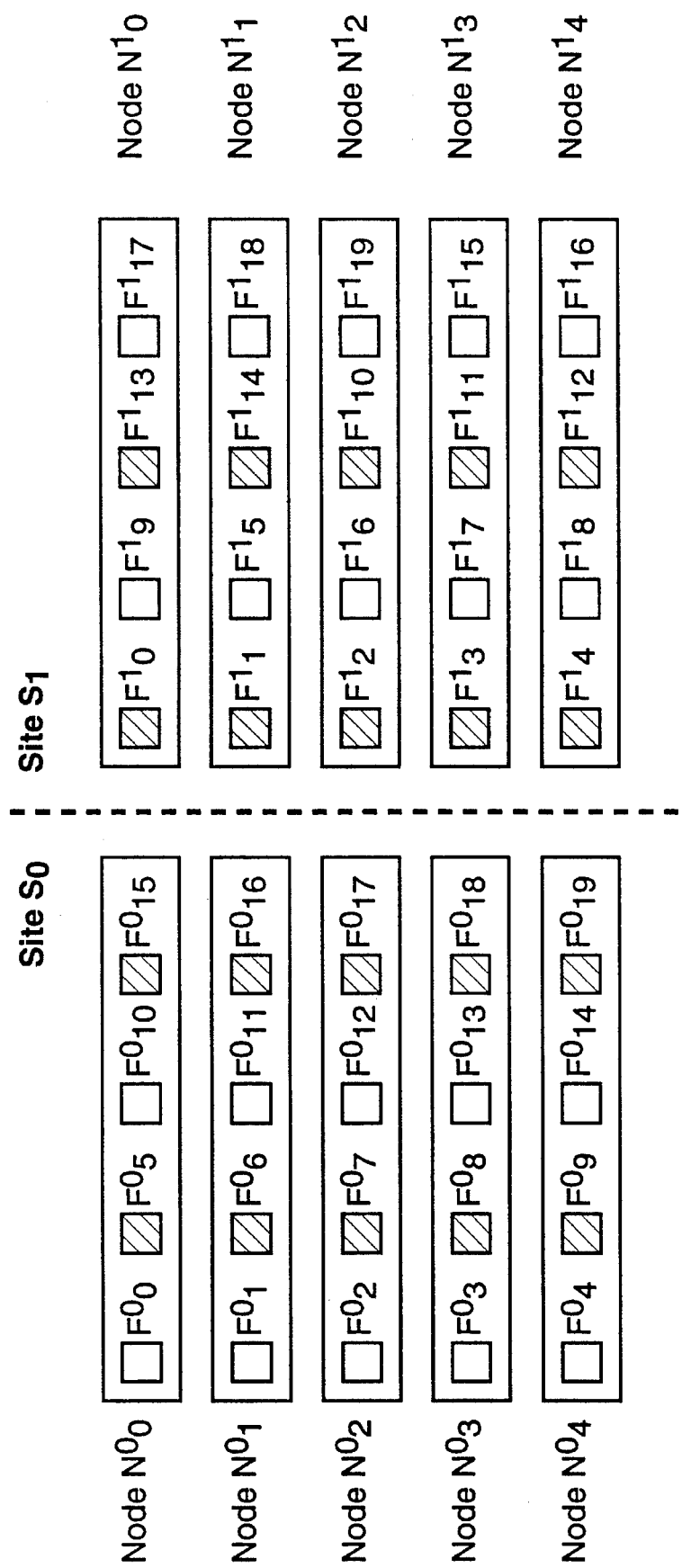
FIGS. 7A–7E depicts fragmentation of a database table over nodes at two distinct sites in accordance with the present invention.

The configuration shown FIG. 7A satisfies the "largest minimum intersection cardinality" requirement. FIG. 7A shows twenty fragments distributed over ten nodes and two sites. No nodes on site $S_0$ have more than one fragment in common with nodes on site $S_1$. The distribution of fragment replicas shown in FIG. 7A is in accordance with the "rotated column" fragment replica assignment method that is discussed in more detail below.

Figure 7B:
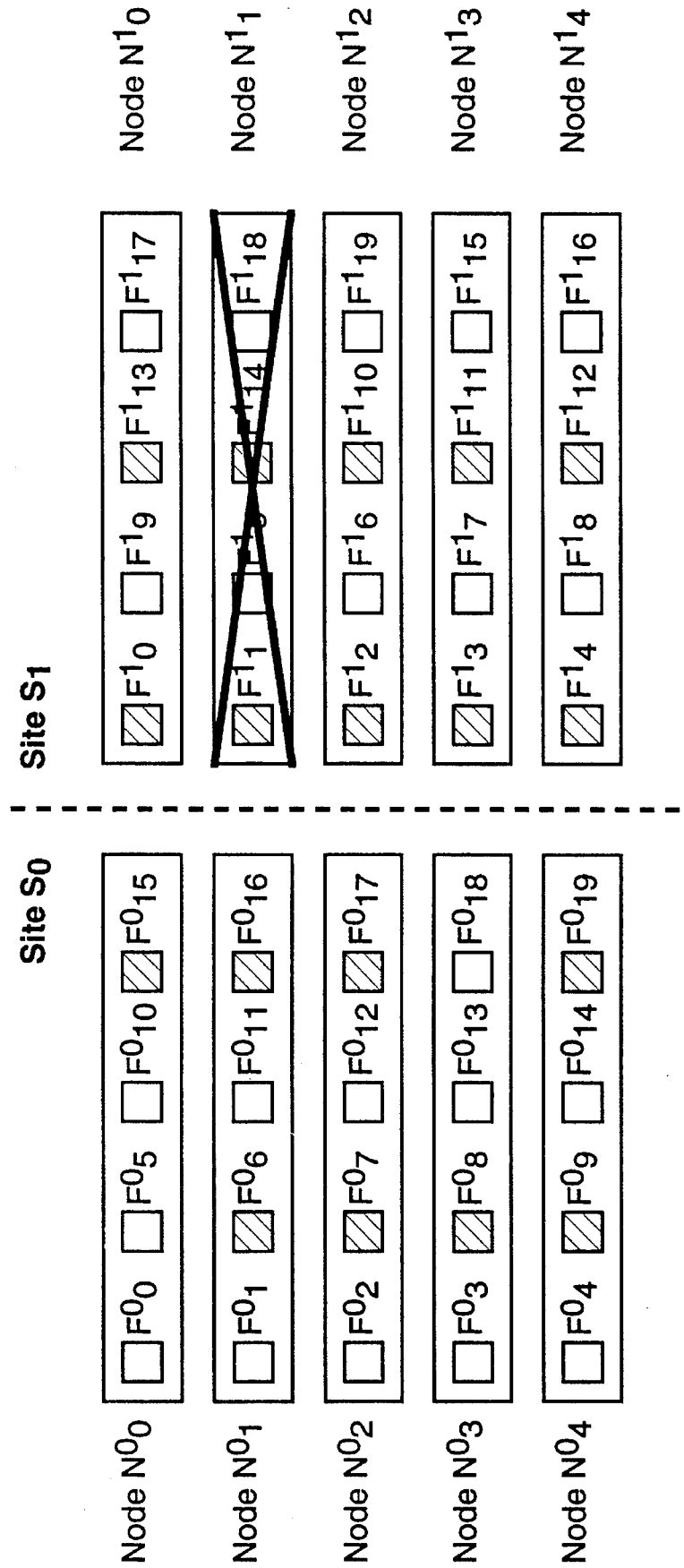

FIG. 7B shows that when node $N^1_1$ fails, fragment replicas $F^0_5$ and $F^0_{18}$ that originally were hot stand-by replicas have to take over as primary replicas, which adds to the computational and I/O load handled by the nodes on which those replicas are located.

Figure 7C:
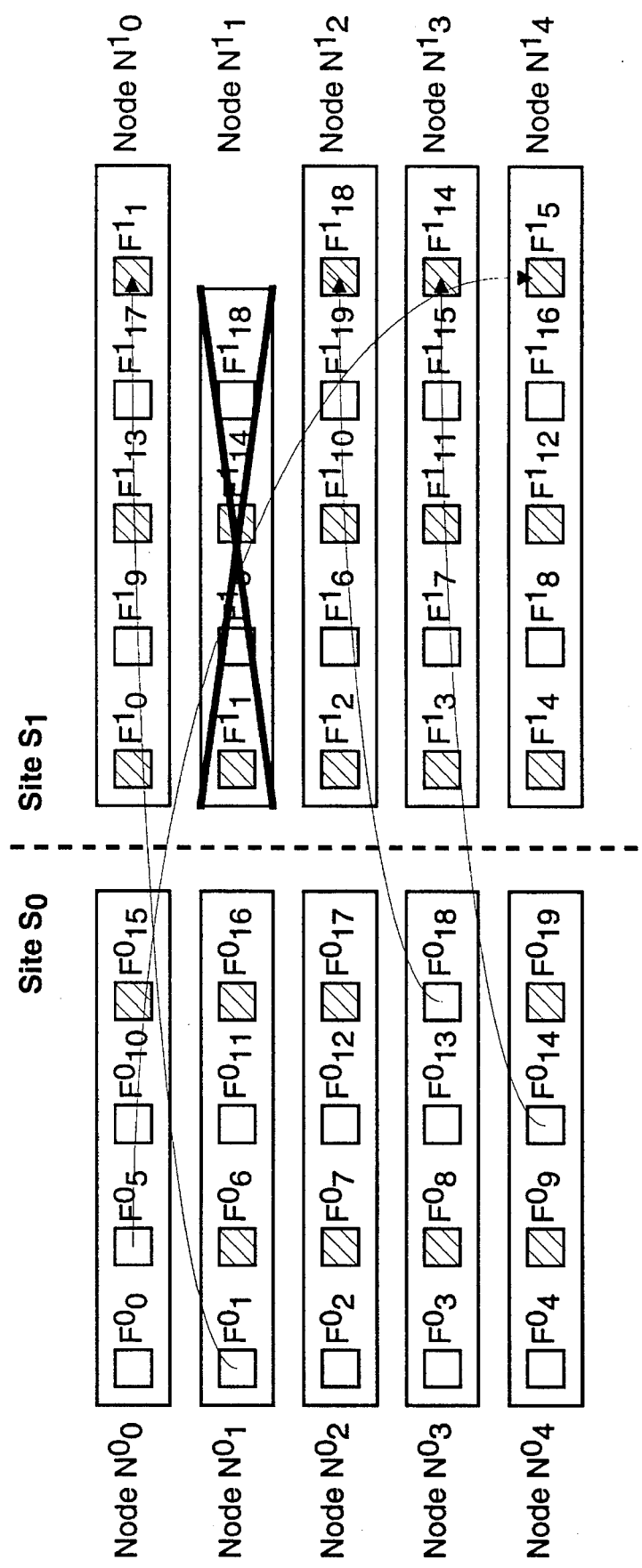

FIG. 7C shows that during the self repair process, when no spare nodes are available (i.e., using distributed sparing), replicas at site $S_0$ nodes are copied so as to generate new replicas of the database fragment replicas on failed node $N^1_1$. The new replicas are distributed over the remaining working nodes at site $S_1$.

Figure 7D:
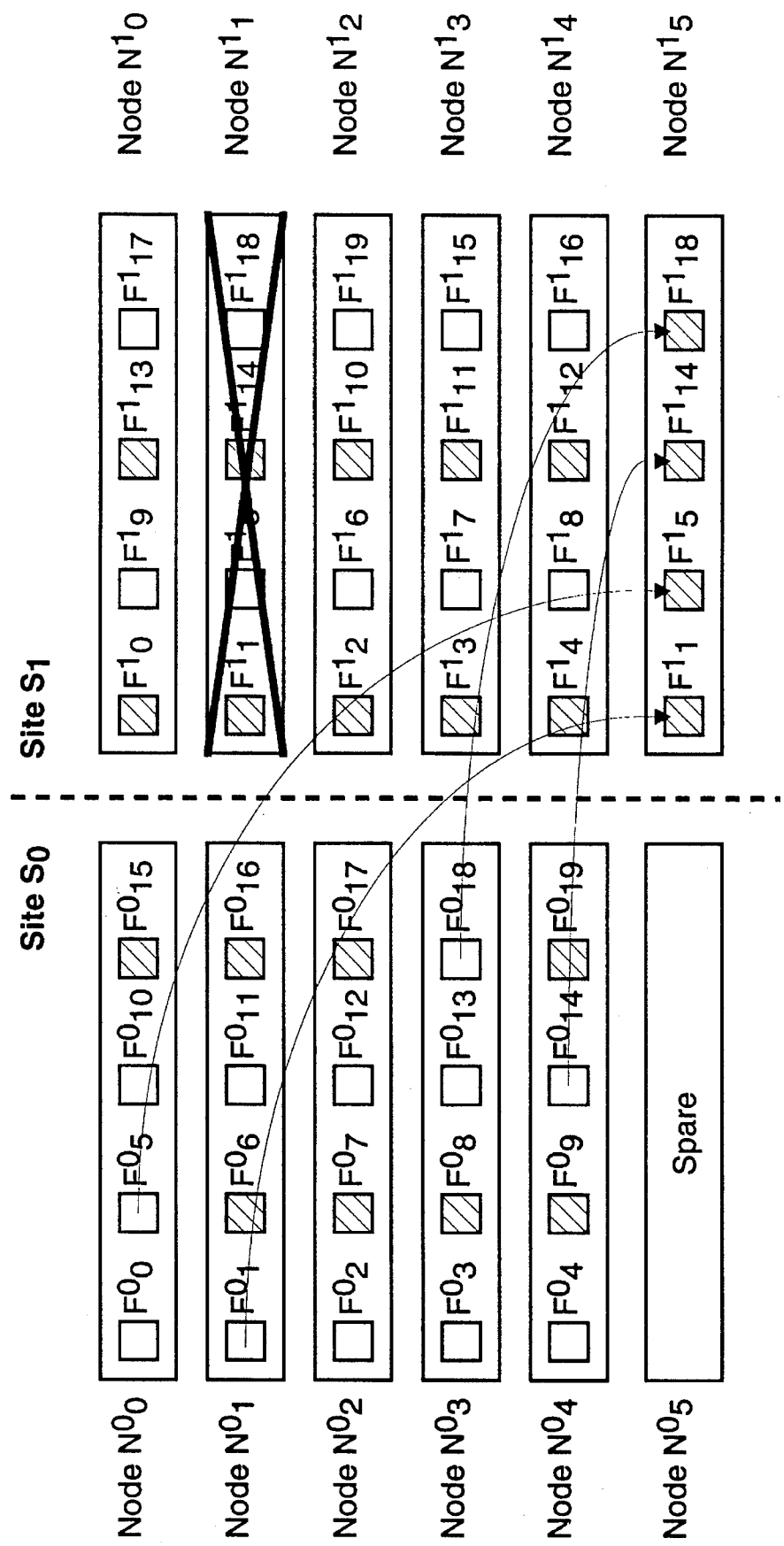

FIG. 7D shows that during the self repair process, when a spare node is available (i.e., using a dedicated spare node), replicas at site $S_0$ nodes are copied so as to generate new replicas of the database fragment replicas on failed node $N^1_1$. The new replicas are created on the spare node $N^1_5$ at site $S_1$.

Figure 7E:
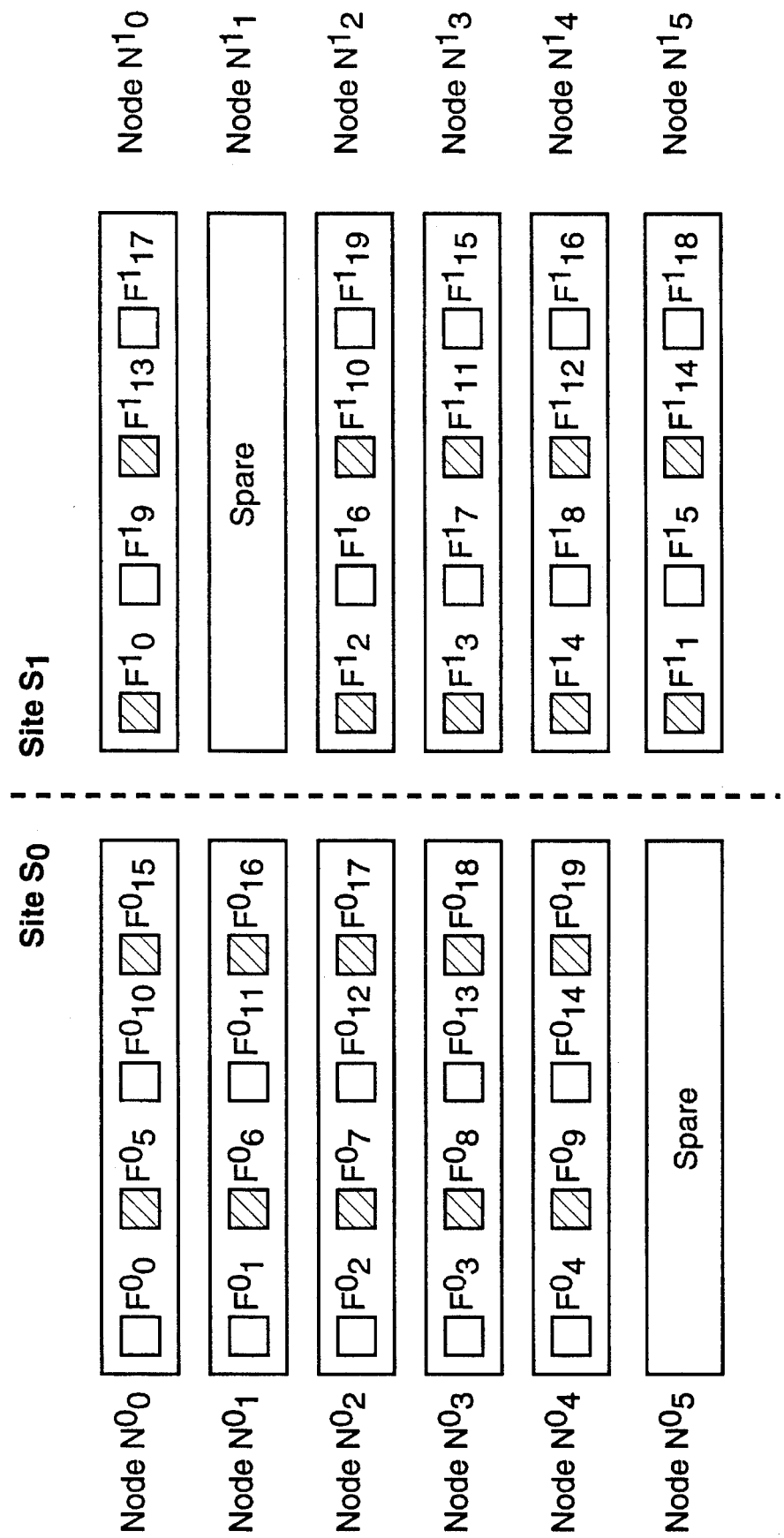

FIG. 7E shows that when failed node $N^1_1$ is repaired or replaced with a working functioning node, the replaced or repaired node becomes the new spare node. Even before failed node $N^1_1$ is repaired or replaced, the load on the system is rebalanced by making fragments $F^1_5$ and $F^1_{18}$ primary replicas and returning fragments $F^0_5$ and $F^0_{18}$ back to hot standby status.

When spare nodes are not available, after the failed node is $N^1_1$ is repaired or replaced, the load on the system is rebalanced by copying the newly generated replicas back to their original location and by making fragments $F^1_5$ and $F^1_{18}$ primary replicas and returning fragments $F^0_5$ and $F^0_{18}$ back to hot standby status.

The fragment replica declustering methodology of the present invention keeps one and only one replica of each database fragment on each site, ensuring that each site can take over service of that database fragment alone. Reproduction of lost replicas inside the same site ensures that this condition holds also after repair of a failed node is completed.

The definition of MISD above is general, but not sufficient for practical use. For a given number of nodes and sites, it is not trivial to find an assignment of fragment replica locations that satisfies the requirements of MISD, and if one is found there is no guarantee that this is the optimal assignment of fragment replica locations. In order for the MISD approach to be useable, a systematic approach for assignment of primary and hot standby fragments to nodes is needed.

Transposed Matrix (TM) fragment assignment method

Referring to Table 1, the result of applying the transposed matrix assignment method to a database fragmented into twenty-five fragments and distributed over five nodes at each of two sites (i.e., a total of ten nodes) is shown. For simplicity, in this example and in all the other examples discussed below, the same number of nodes $N_s$(site) are used at each site.

In Table 1, the numbers shown in the main part of the table are fragment numbers. Thus, in the first column under the "Transposed Matrix" heading, the numbers 0, 1, 2, 3, and 4 refer to database table fragments $F^0_0$, $F^0_1$, $F^0_2$, $F^0_3$, and $F^0_4$. Furthermore in Table 1 primary replicas are represented by bold numbers, and hot standby replicas are represented by numbers in normal, non-bolded type.

Using the transposed matrix assignment method, it is preferred that the database to be stored in the system be fragmented into F fragments, where F is any number between $kN_s(N_s-1)$ and $kN_s^2$, where $N_s$ is the number of nodes at each site and k is a positive integer. The preferred number of fragments is $N_s^2$.

Fragments are assigned to nodes in the transposed matrix assignment method as follows. At a first site (site $S_0$ in the example shown in Table 1), the fragments are assigned to nodes in a round-robin fashion, which each successive fragment being assigned to a sequentially next node. Then, all the fragments stored on each individual node at the first site are assigned to distinct ones of the nodes at the second site. Thus, if replicas of fragments A, B, C, D and E are stored on a single node at the first site, replicas of fragments A, B, C, D and E are each stored on different nodes at the second site. When viewing the fragment assignments as a matrix, as shown in Table 1, the fragment assignments for the second site are derived from the fragment assignments for the first site by transposing the matrix of fragment assignments for the first site.

The transposed matrix assignment method is an optimal assignment scheme when just two sites are being used to store a relation, in that the intersection between any pair of fragment sets (i.e, one set from each of two distinct sites) is never greater than one fragment. However, the transposed matrix assignment method is applicable only to two site systems, and does not provide fragment assignments, optimal or otherwise, for additional sites.

As shown in Table 1, primary and hot standbys are assigned in a checkerboard pattern. This is possible due to the transposition symmetry.

TABLE 1

| Site | Node | Fragment Assignment Schemes | | | | | | | | | | | | | |
|------|------|---|---|---|---|---|---|---|---|---|---|---|---|---|---|
| | | Transposed Matrix | | | | | Rotated Columns | | | | | Empty Diagonal | | | |
| $S_0$ | $N^0_0$ | 0 | 5 | 10 | 15 | 20 | 0 | 5 | 10 | 15 | 20 | 0 | 5 | 10 | 15 |
| | $N^0_1$ | 1 | 6 | 11 | 16 | 21 | 1 | 6 | 11 | 16 | 21 | 1 | 6 | 11 | 16 |
| | $N^0_2$ | 2 | 7 | 12 | 17 | 22 | 2 | 7 | 12 | 17 | 22 | 2 | 7 | 12 | 17 |
| | $N^0_3$ | 3 | 8 | 13 | 18 | 23 | 3 | 8 | 13 | 18 | 23 | 3 | 8 | 13 | 18 |

TABLE 1-continued

Fragment Assignment Schemes

| Site | Node | Transposed Matrix | | | | | Rotated Columns | | | | | Empty Diagonal | | | | |
|---|---|---|---|---|---|---|---|---|---|---|---|---|---|---|---|---|
|  | $N_4^0$ | 4 | 9 | 14 | 19 | 24 | 4 | 9 | 14 | 19 | 24 | 4 | 9 | 14 | 19 |  |
| $S_1$ | $N_0^1$ | 0 | 1 | 2 | 3 | 4 | 0 | 9 | 13 | 17 | 21 |  | 4 | 8 | 12 | 16 |
|  | $N_1^1$ | 5 | 6 | 7 | 8 | 9 | 1 | 5 | 14 | 18 | 22 | 0 |  | 9 | 13 | 17 |
|  | $N_2^1$ | 10 | 11 | 12 | 13 | 14 | 2 | 6 | 10 | 19 | 23 | 1 | 5 |  | 14 | 18 |
|  | $N_3^1$ | 15 | 16 | 17 | 18 | 19 | 3 | 7 | 11 | 15 | 24 | 2 | 6 | 10 |  | 19 |
|  | $N_4^1$ | 20 | 21 | 22 | 23 | 24 | 4 | 8 | 12 | 16 | 20 | 3 | 7 | 11 | 15 |  |

Rotated Columns (RC) fragment assignment method

Referring to Table 1, the rotated columns fragment assignment method assigns fragments to the nodes at a first site (e.g., $S_0$ in Table 1) in a round-robin fashion. Then the rotated columns assignment method assigns fragments to nodes at each additional site in a round-robin fashion similar to the fragment location assignments for site $S_0$, except that the starting node is shifted by Q nodes each time a column fills up, where Q is an integer "rotation quotient." The rotation quotient is set equal to 0 for site $S_0$ and is set equal to 1 for site $S_1$ in the example in Table 1. Thus, in Table 1 the table for fragment assignments for the second site $S_1$ visually looks like each column is rotated one step down relative to the preceding column.

While, in this example the same number of nodes $N_s$ are used at each site, the rotated column fragment assignment methodology of the present invention is equally applicable to a system with different numbers of nodes at each site, since the fragment assignment methodology for assigning fragments to nodes at any site is independent the fragment assignments on any other site.

In the rotated columns methodology, each site is assigned a rotation quotient (Q). Each site must be assigned a different rotation quotient than the other sites. Furthermore, each rotation quotient must be an integer having a value between 0 and $N_s-1$. The database fragments are assigned numerical indices ranging from 0 to F−1, where F is the number of fragments into which the database has been fragmented. While there are no restrictions on the selection of the value of F, in the preferred embodiment F is set equal to at least twice the number of nodes (2·$N_s$) at the site with the smallest number of nodes.

Database fragments are assigned to the nodes at a site in round robin order. At each site S, the first $N_s$ database fragments $F^s_x$, for x=0 to $N_s-1$, are assigned sequentially to each of the nodes. Then, the assignment of the next $N_s$ fragments starts at a node shifted by a number of steps governed by the rotation quotient. For instance, as shown in the part of Table 1 entitled "Rotated Columns," twenty-five fragments are assigned to five nodes in site $S_0$ with an assigned rotation quotient of 0, and twenty-five fragments are assigned to five nodes in site $S_1$ with an assigned rotation quotient of 1.

Primary fragment replicas and hot standby fragment replicas are preferably assigned in alternating columns, as shown in Table 1. Numerous other schemes for assigning primary and hot standby status will produce an equally even load distribution over the nodes.

The rotated columns fragment assignment method is also applicable to multiple site database server systems that use a "read any write all" methodology (often called the read one write all methodology) instead of the primary/hot standby model of the preferred embodiment. In a "read any write all" system, each database fragment is still stored on nodes at two or more sites, but none of the database fragments is considered to be the primary replica. Rather, the server can access any of the replicas of a fragment for read access to a particular tuple or record in the database. When a tuple is updated, all replicas of the associated fragment must be updated (which is also true in the primary/standby systems). "Read any write all" systems thereby distribute the load associated with read accesses over all the nodes and database fragment replicas, which can be advantageous in some systems, especially systems with light write access loads and heavy read access loads and sites that are located far (e.g., over a thousand kilometers) from each other.

Table 2 is a pseudocode representation of a procedure, called the MapNode function, for determining the node on which a fragment replica should be stored, including the node to which the fragment replica should be assigned when there is a failure of the node on which the fragment replica was previously stored. The MapNode function is designed for use in "distributed spare" systems or sites which do not have a dedicated spare node.

TABLE 2

```
Function MapNode (FragNo, S)
/*  Pseudocode of procedure for mapping a fragment replica to
    a node when a "distributed spare" is used (i.e., a dedicated
    spare node is not used) */
/*  Q(S)      = rotation quotient for site S
                For example, Q(s) might be equal to 0 for site
                S₀ and equal to 1 for site S₁
    state(n)  = state of node, "up" or "down"
    avail     = number of nodes believed to be "up"
    nodemap   = array of nodes believed to be "up"
    N_S       = the number of non-spare nodes at a particular
                site S on which fragment replicas are
                to be stored
*/
{
    avail = N_S
    For vnode := 0 to avail−1
        {
        nodemap(vnode) := vnode
        }
    Do Forever
        {
        vnode := (FragNo + (FragNo div N_S)·Q(S))
                 modulo avail
        If state(nodemap(vnode)) = up
            Return nodemap(vnode)
        /* node failure detected: */
        avail := avail −1
        if avail = 0       /* If no nodes are available,
                              abort procedure */
            Return −1
        /* remap nodes */
        For i := vnode to avail−1
            {
            nodemap(i) = nodemap(i+1)
            }
        }
}
```

The MapNode function is called separately for every fragment replica. Thus a failure of node X on site Y does not affect the node assignment of fragment replicas on other nodes and sites. In other words, the MapNode function makes an initial node assignment for a specified fragment (FragNo) on a specified site (Site), and then leaves that assignment unchanged unless the node to which the fragment was originally assigned fails. In that case, the node indices for the nodes at the site of the failed node are "remapped" for purposes of providing a contiguous set of node indices (i.e., 0 to avail-1, where avail is the number of available node), and then the fragment previously stored on the failed node is assigned to another node using the same "fragment to node assignment" function used to make the initial node assignment, except that the assignment will now be different because the number of available nodes has changed and the node indices have been remapped onto the available nodes.

More specifically, the MapNode function initially assigns each fragment $F^s_x$ to a data processor y at site S in accordance with the following fragment to node assignment equation:

$$y = (x + (x \text{ div } N_s) \cdot Q(S)) \text{ modulo avail}$$

where y is the node index of the node on which fragment $F^s_x$ is to be stored, $N_s$ is the number of data processors at site $S_1$ used for storing database fragments, $Q(S)$ is an integer "rotation quotient" between 0 and $N_s-1$ where $Q(S)$ is a distinct value for each said site, and avail is the number of the $N_s$ data processors that have not failed. Assuming that all processors are initially working, avail is initially equal to $N_s$.

When a node fails, the MapNode function will first remap the node indices for the non-failed nodes at the site of the failed node into a new contiguous set ranging from 0 to avail-1, where avail is the number of data processors that have not failed. Then the modulo function shown above is re-executed to determine a new node assignment for the fragment previously stored on the failed node. The fragment is then regenerated on the node associated with its new node assignment.

The MapNode function can also be used for the initial assignment of node locations in systems or sites having a dedicated spare node. However, when a dedicated spare is available, new copies of the fragment replicas lost on the failed node are simply assigned to and created on the dedicate spare node at the same site as the failed node.

Empty Diagonal (ED) fragment assignment method

The empty diagonal fragment assignment method is a specialization of the rotated column method. The empty diagonal method assumes that the database is split into $F=kN_s(N_s-1)$ fragments. The fragments are assigned in round-robin fashion at site $S_0$. At site $S_1$, the fragments are assigned in round-robin fashion, but for each $N_s$'th fragment one node is skipped, starting with the first node, as shown in Table 1.

By studying Table 1 it can be seen that the rotated column and empty diagonal methods assign fragments identically except for the node enumeration at site $S_1$. For example, the fragments assigned to node $N^1_0$ in the rotated columns method are the same as the fragments assigned to node $N^1_1$ in the empty diagonal method. Primary and hot standby status are assigned to the database fragments in the same way as for the rotated column method.

When a node fails $k(N_s-1)$ fragment replicas are lost. Using "distributed sparing" each remaining node at the site of the failed node is assigned k new fragments, increasing the load on each such node by a factor of $1/(N_s-1)$. This ensures an even load redistribution. When there is a second failure at a site, the reassigned fragments will usually result in a less than perfectly even load redistribution.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A multiprocessor computer system, comprising:

N data processors, wherein N is a positive integer greater than three, each data processor having its own, separate, central processing unit, memory for storing database tables and other data structures, and communication channels for communication with other ones of said N data processors; each of said N data processors independently executing a distinct instruction data stream;

at least a plurality of said N data processors including a communications processor for receiving transaction requests and for transmitting responses thereto;

said N data processors being divided into at least two groups, each having at least two data processors;

each data processor including:

fragmenting means for fragmenting each of said database tables into N fragments, and for storing replicas of each fragment in different ones of said N data processors, wherein said different ones of said N data processors are in different ones of said groups of data processors such that a complete copy of each of said database tables is located within each said group of data processors and such that simultaneous failure of all data processors in either of said groups would leave a complete copy of each of said database tables in the other of said groups of data processors;

a data dictionary that stores information indicating where each said replica replica of each fragment of said database tables is stored among said N data processors;

said fragmenting means further adapted for changing the information stored in said data dictionary upon failure of any one of said N data processors to indicate that the replicas stored on the failed data processor are not available, and for regenerating said replicas on the failed data processor in non-failed ones, if any, of the data processors in the same group of data processors as the failed data processor; and said fragmenting means further adapted for dividing said database tables into F fragments $F^S_x$, for storing said F fragments in the data processors in each said group, where for a particular fragment $F^S_x$, S identifies the group of data processors in which the fragment is stored and x is an index that identifies the fragment and has a value between 0 and F–1; said fragmenting means adapted to assign each fragment $F^S_x$ to a data processor y in group S in accordance with the following fragment to node assignment equation:

$$y = (x + (x \text{ div } N_S) \cdot Q(S)) \text{ modulo avail}$$

where y identifies which data processor fragment $F^S_x$ is assigned to, $N_S$ is the number of data processors in group S used for storing database fragments, $Q(S)$ is an integer between 0 and $N_S-1$ where $Q(S)$ is a distinct value for each said group, and avail is the number of said $N_S$ data processors that have not failed.

2. The multiprocessor computer system of claim 1, wherein each of said groups of data processors have different power supplies and different cooling systems.

3. The multiprocessor computer system of claim 1, wherein said fragmenting means is adapted to respond to failure of a data processor in one of said groups by (A) remapping data processor indices y associated with said one group into a contiguous set ranging from 0 to avail−1, where avail is the number of said data processors at said one site that have not failed, and (B) reassigning each fragment $F^S_x$ previously stored on said failed data processor to another data processor y in said one group S in accordance with said fragment to node assignment equation.

4. The multiprocessor computer system of claim 1,
wherein said fragmenting means in each data processor is adapted to respond to failure of one of said N data processors by (A) updating said data dictionary to indicate that the fragment replicas on said one data processor are not available, (B) locating available ones of said fragment replicas corresponding to the fragment replicas on said one data processor, and (C) storing on a subset of said N data processors that have not failed, new replicas of the fragment replicas made unavailable by said failure on said one data processor such that a replica of each said database table fragment is stored in data processors that have not failed in each group of data processors.

5. A method of distributing data storage and transactional workloads in multiprocessor computer system having:
N data processors, wherein N is a positive integer greater than three, each data processor having its own, separate, central processing unit, memory for storing database tables and other data structures, and communication channels for communication with other ones of said N data processors;
at least a plurality of said N data processors including a communications processor that receives transaction requests and transmits responses thereto;
said N data processors being divided into at least two groups, each having at least two data processors;
the steps of the method comprising:
independently executing a distinct instruction data stream on each of said N data processors;
fragmenting each of said database tables into N fragments, and storing replicas of each fragment in different ones of said N data processors, wherein said different ones of said N data processors are in different ones of said groups of data processors such that a complete copy of each of said database tables is located within each said group of data processors and such that simultaneous failure of all data processors in either of said groups would leave a complete copy of each of said database tables in the other of said groups of data processors;
said fragmenting step including allocating each record in any one of said database tables to a particular one of its N fragments in accordance with predefined criteria;
storing in a data dictionary in each of said N data processors information indicating where each said replica of each fragment of said database tables is stored among said N data processors; and
upon failure of any one of said N data processors, changing the information stored in said data dictionary to indicate that the replicas stored on the failed data processor are not available;
said fragmenting step including dividing said database tables into F fragments $F^S_x$, storing said F fragments in the data processors in each said group, where for a particular fragment $F^S_x$, S identifies the group of data processors in which the fragment is stored and x is an index that identifies the fragment and has a value between 0 and F−1; said fragmenting step assigning each fragment $F^S_x$ to a data processor y in group S in accordance with the following fragment to node assignment equation:

$$y = (x + (x \text{ div } N_S) \cdot Q(S)) \text{ modulo avail}$$

where y identifies which data processor fragment $F^S_x$ is assigned to, $N_S$ is the number of data processors in group S used for storing database fragments, Q(S) is an integer between 0 and $N_S$−1 where Q(S) is a distinct value for each said group, and avail is the number of said $N_S$ data processors that have not failed.

6. The method of claim 5, wherein when a data processor in one of said groups fails, indices y associated with said groups are remapped into a contiguous set ranging from 0 to avail-1, where avail is the number of said data processors at said one site that have not failed, and then reassigning each fragment $F^S_x$ previously stored on said failed data processor to another data processor y in said one group S in accordance with said fragment to node assignment equation.

7. The method of claim 5,
further including responding to failure of one of said N data processors by (A) updating said data dictionary to indicate that the fragment replicas on said one data processor are not available, (B) locating available ones of said fragment replicas corresponding to the fragment replicas on said one data processor, and (C) storing on a subset of said N data processors that have not failed, new replicas of the fragment replicas made unavailable by said failure on said one data processor such that a replica of each said database table fragment is stored in data processors that have not failed in each group of data processors.

* * * * *